US008305842B2

(12) United States Patent
Holdsworth

(10) Patent No.: US 8,305,842 B2
(45) Date of Patent: Nov. 6, 2012

(54) LOCATION SYSTEM FOR ASSET OR PERSONNEL TRACKING USING MULTI-FREQUENCY ULTRASONIC TRANSDUCERS AND GOERTZEL FILTERS

(75) Inventor: Dennis Edward Charles Holdsworth, Sheffield (GB)

(73) Assignee: Merlin360.Com Limited (GB)

( * ) Notice: Subject to any disclaimer, the term of this patent is extended or adjusted under 35 U.S.C. 154(b) by 603 days.

(21) Appl. No.: 12/532,328

(22) PCT Filed: May 6, 2008

(86) PCT No.: PCT/GB2008/001577
§ 371 (c)(1),
(2), (4) Date: Oct. 19, 2009

(87) PCT Pub. No.: WO2008/139147
PCT Pub. Date: Nov. 20, 2008

(65) Prior Publication Data
US 2010/0102965 A1    Apr. 29, 2010

(30) Foreign Application Priority Data
May 11, 2007    (GB) .................. 0709075.6

(51) Int. Cl.
*G08B 21/00*    (2006.01)

(52) U.S. Cl. ................ 367/93; 340/539.13; 340/572.1
(58) Field of Classification Search ............. 340/572.1, 340/10.1, 539.1–539.15; 367/93, 94
See application file for complete search history.

(56) References Cited

U.S. PATENT DOCUMENTS

| 3,439,320 | A | 4/1969 | Ward |
| 3,696,384 | A | 10/1972 | Lester |
| 4,225,953 | A | 9/1980 | Simon et al. |
| 5,477,465 | A | 12/1995 | Zheng |
| 5,504,477 | A | 4/1996 | Whitright et al. |
| 2005/0128099 | A1 | 6/2005 | Drouin et al. |
| 2005/0232081 | A1 | 10/2005 | Holm |
| 2006/0013070 | A1 | 1/2006 | Holm et al. |

FOREIGN PATENT DOCUMENTS

| GB | 2 305 074 | A | 3/1997 |
| WO | 02/41029 | A1 | 5/2002 |
| WO | 03/087868 | A2 | 10/2003 |
| WO | 03/087871 | A1 | 10/2003 |
| WO | 03/093867 | A1 | 11/2003 |
| WO | 2006/095463 | A1 | 9/2006 |

OTHER PUBLICATIONS

Great Britain Intellectual Property Office Patentability Search Report.

*Primary Examiner* — Jeffery Hofsass
(74) *Attorney, Agent, or Firm* — Clark Hill PLC

(57) ABSTRACT

A location system, for the tracking of personnel or products for establishing the location of an identification tag attached to a person or product, has the tag comprising a power source; an ultrasonic transducer; a transmitter connected to an output signal from the transducer and capable of transmitting multiple frequencies to establish the unique ID of the tag in question, including a first frequency solely to identify when a tag is about to start transmitting data; the system comprising further a plurality of strategically located ultrasonic receiver; and processing means including a reader incorporating a number of Goertzel filters corresponding to the number of frequencies transmitted to process output signals from the ultrasonic receivers to establish the ID of the read tag and its location.

10 Claims, 2 Drawing Sheets

LOCATION SYSTEM FOR ASSET OR PERSONNEL TRACKING USING MULTI-FREQUENCY ULTRASONIC TRANSDUCERS AND GOERTZEL FILTERS

RELATED/PRIORITY APPLICATION

This application is a National Phase riling regarding International Application No. PCT/GB2008/001577, filed on May 6, 2008. International Application No PCT/GB2008/001577 relies upon British Application No. 0709075.6, filed on May 11, 2007 for priority.

FIELD OF THE INVENTION

This invention relates to a location system for the tracking of personnel, or products located indoors, for establishing the location of an identification tag attached to a person or product, in contrast to widely used outdoor location systems using GPS and satellites.

BACKGROUND OF THE INVENTION

The requirement for real time information as to the indoor location of products of value, such as PC's, hospital equipment etc which are routinely subject to relocation has led to proposals such as described in
US 2005/0232081
US 2005/128099
US 2006/013070
etc.
Also in GB 2305074 is described a data signal processor that uses Goertzel's algorithm to identify carrier modulation and data transmission system used by a tag to communicate data to a reader.

OBJECT OF THE INVENTION

A basic object of the present invention is the provision of an improved indoor location system for tracking of tagged personnel or products.

SUMMARY OF THE INVENTION

According to the present invention, there is provided a location system, for the tracking of personnel or products for establishing the location of an identification tag attached to a person or product, wherein the tag comprises:
(i) a power source;
(ii) an ultrasonic transducer;
(iii) a transmitter connected to an output signal from the transducer and capable of transmitting multiple frequencies to establish the unique ID of the tag in question, including a first frequency solely to identify when a tag is about to start transmitting data;
(iv) a plurality of strategically located ultrasonic receivers; and
(v) processing means including a reader incorporating a number of Goertzel filters corresponding to the number of frequencies transmitted to process output signals from the ultrasonic receivers to establish the ID of the read tag and its location.

ADVANTAGES OF THE INVENTION

The location system in accordance with the invention uses both the time and frequency domains to efficiently pack information into the ultrasonic band, distinguishing between a number of different transmissions. In addition the Goertzel algorithm overcomes interference from environmental noise by the use of the digital signal processing filters which train on the energy levels of the wanted signals only. The Goertzel algorithm is widely used in dtmf tone decoding in the telecoms industry and this design uses this algorithm in a novel manner to work in the ultrasonic band.

Collisions are handled by the algorithm to remove corrupted transmissions and time domain is used by randomising transmission gaps to allow the greatest possible probability of reception in a crowded spectrum.

PREFERRED OR OPTIONAL FEATURES

The highly efficient use of processing allows for a large number (up to 10) of ultrasonic receivers to be simultaneously handled by one reader in real time.

The reader collates the signals received from each receiver to provide quantifiable information on reception timings and signal strengths which give a picture of echoes and reflections. This is then used to determine the bearing of the original signal.

Readers can also be networked in arrays to allow greater differentiation of signal origin.

In detail, the identification tags use a combination of five frequencies to transmit the tag's unique ID and event status to the ultra sonic readers (f1-f5). A start frequency (f3) is used to solely identify when a tag is about to start transmitting, whilst frequencies f1,f2,f4,f5 are used to transmit the data.

The use of a start frequency is used for tag-reader synchronization and also allows the reader to detect collisions on the air-interface.

Figure 1:
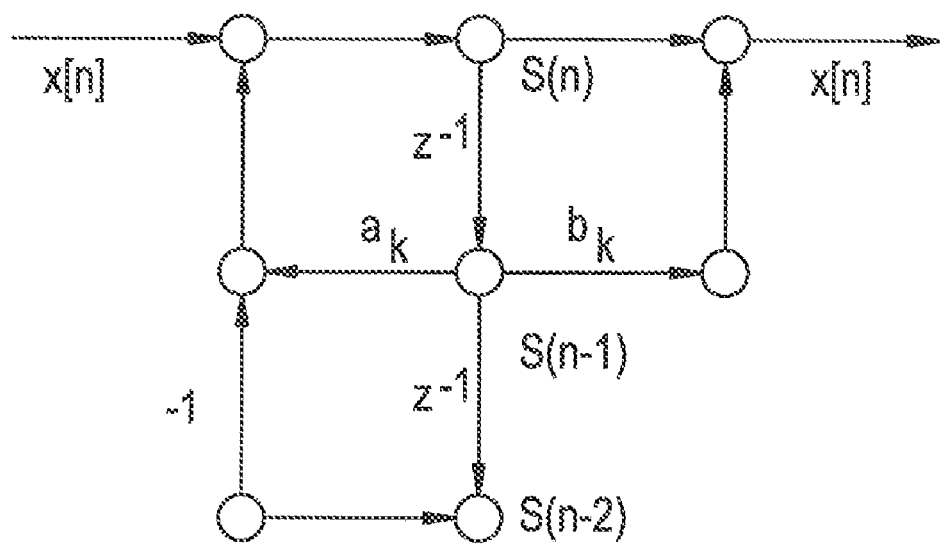
FIG. 1 is a representation of Dr. Goertzel's algorithm, $s(n)=x(n)+2\cos(2\pi m)s(n-1)-s(n-2)$, wherein the circles have no particular significance.

The ultrasonic reader uses a Goertzel algorithm as published by Dr Gerald Goertzel in 1958. The algorithm is a second-order filter that extracts the energy present at a specific frequency—see FIG. 1.

Although five frequencies/transmissions are referred to, it would of course be possible for a greater or lesser number to be used, depending upon particular requirements of the system.

The ultrasonic reader uses five Goertzel filters on the data sampled from each ultrasonic transducer to detect the discrete frequencies.

The five frequencies used within the 40 KHz ultrasonic band are:

| | |
|---|---|
| f1 | 39.216 KHz |
| f2 | 39.604 KHz |
| f3 | 40.000 KHz |
| f4 | 40.404 KHz |
| f5 | 40.816 KHz |

To effectively detect each frequency the system samples each ultrasonic transducer at 104.2 KHz with a sample window size of 2048.

Figure 2:
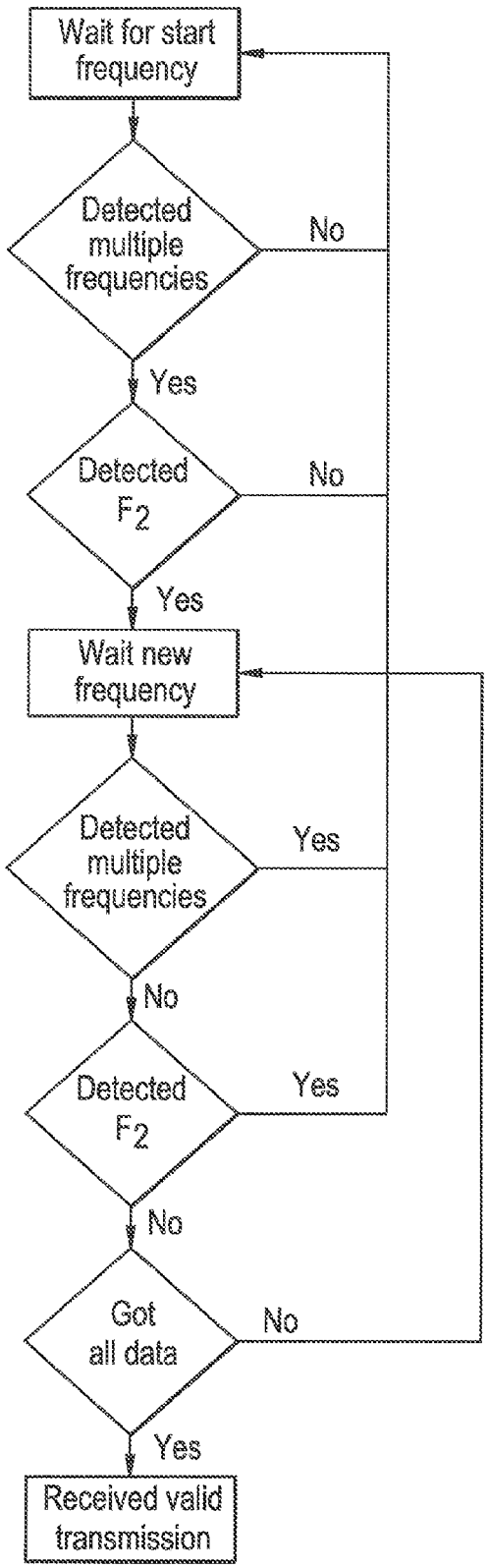
FIG. 2 shows a preferred mode of operation.

A preferred mode of operation is shown in FIG. 2.

The invention claimed is:

1. A location system, for the tracking of personnel or products for establishing the location of an identification tag attached to a person or product, the location system comprising a tag, wherein the tag comprises:
   (i) a power source;
   (ii) an ultrasonic transducer;
   (iii) a transmitter is connected to an output from said transducer and operable to transmit multiple frequencies to establish the unique ID of said tag in question, the location system further comprising:
   (iv) a plurality of strategically located ultrasonic receivers; and
   (v) processing means including a reader operable to process output signals from said ultrasonic receivers to establish the ID of said read tag and its location, wherein the transmitter is operable to transmit a first frequency solely to identify when said tag is about to start transmitting data, and wherein the reader incorporates a number of Goertzel filters corresponding to the number of frequencies transmitted to process the output signals from the ultrasonic receivers.

2. A location system as claimed in claim 1, wherein a large number, up to 10, of ultrasonic receivers are simultaneously handled by one said reader in real time.

3. A location system as claimed in claim 1, wherein said reader collates said signals received from each of said receivers to provide quantifiable information on reception timings and signal strengths which give a picture of echoes and reflections.

4. A location system as claimed in claim 3, wherein said picture of echoes and reflections is then used to determine the bearing of the original signal.

5. A location system as claimed, in claim 1, comprising a plurality of said readers networked in arrays to allow greater differentiation of signal origin.

6. A location system as claimed in claim 1, wherein said identification tag uses a combination of five frequencies, f1-f5, to transmit said tag's unique ID and event status to said ultrasonic readers.

7. A location system as claimed in claim 6, wherein a start frequency (f3) is used to solely identify when said tag is about to start transmitting, whilst frequencies f1, f2, f4, f5 are used to transmit the data.

8. A location system as claimed in claim 6, wherein said ultrasonic reader uses five Goertzel filters to detect the discrete frequencies.

9. A location system as claimed in claim 8, wherein said five frequencies used within the 40 KHz ultrasonic band are:

| | |
|---|---|
| f1 | 39.216 KHz |
| f2 | 39.604 KHz |
| f3 | 40.000 KHz |
| f4 | 40.404 KHz |
| f5 | 40.816 KHz. |

10. A location system as claimed in claim 9, wherein to effectively detect each said frequency the system samples each ultrasonic transducers at 104.2 KHz with a sample window size of 2048.

* * * * *